(12) United States Patent
Maeda et al.

(10) Patent No.: US 8,572,955 B2
(45) Date of Patent: Nov. 5, 2013

(54) FLUIDIC TORQUE TRANSFER DEVICE

(75) Inventors: Koji Maeda, Anjo (JP); Kazuyoshi Ito, Tsushima (JP); Akihiro Nagae, Anjo (JP); Yoshihide Mori, Anjo (JP); Junya Kashimura, Anjo (JP)

(73) Assignee: Aisin AW Co., Ltd., Anjo (JP)

( * ) Notice: Subject to any disclaimer, the term of this patent is extended or adjusted under 35 U.S.C. 154(b) by 476 days.

(21) Appl. No.: 12/926,466

(22) Filed: Nov. 19, 2010

(65) Prior Publication Data
US 2011/0135484 A1 Jun. 9, 2011

(30) Foreign Application Priority Data

Nov. 19, 2009 (JP) .................................. 2009-263901
Mar. 31, 2010 (JP) .................................. 2010-080836

(51) Int. Cl.
*F16D 33/20* (2006.01)
(52) U.S. Cl.
USPC ............ 60/365; 60/367; 415/188; 416/197 C; 416/180
(58) Field of Classification Search
USPC ..... 416/223 B, DIG. 5, 197 C, 180; 415/188, 415/187, 191; 60/361, 362, 365, 367
See application file for complete search history.

(56) References Cited

U.S. PATENT DOCUMENTS

| | | | |
|---|---|---|---|
| 4,080,786 A | | 3/1978 | Åhlén |
| 5,058,027 A | * | 10/1991 | Becraft ........................... 700/97 |
| 6,289,674 B1 | * | 9/2001 | Halene et al. .................... 60/361 |
| 6,632,071 B2 | * | 10/2003 | Pauly ............................ 416/185 |
| 2003/0115862 A1 | | 6/2003 | Okada et al. |
| 2007/0108007 A1 | * | 5/2007 | Matsumoto et al. ......... 192/3.29 |

FOREIGN PATENT DOCUMENTS

| | | |
|---|---|---|
| JP | A-52-97074 | 8/1977 |
| JP | A-62-177354 | 8/1987 |
| JP | A-04-092145 | 3/1992 |
| JP | A-09-112649 | 5/1997 |
| JP | A-2000-110915 | 4/2000 |
| JP | A-2002-544448 | 12/2002 |
| JP | A-2003-194185 | 7/2003 |
| JP | A-2007-132459 | 5/2007 |
| JP | A-2008-196646 | 8/2008 |

OTHER PUBLICATIONS

Feb. 8, 2011 International Search Report issued in International Patent Application No. PCT/JP2010/070734 (with English translation).
Feb. 8, 2011 International Search Report issued in PCT/JP2010/070735 (with translation).
May 8, 2013 Office Action issued in U.S. Appl. No. 12/926,464.
Maeda et al., U.S. Appl. No. 12/926,464, filed Nov. 19, 2010.

* cited by examiner

*Primary Examiner* — Edward Look
*Assistant Examiner* — William Grigos
(74) *Attorney, Agent, or Firm* — Oliff & Berridge, PLC (57) ABSTRACT

A fluidic torque transfer device configured with a pump impeller that includes a pump shell, a pump blade attached to the pump shell, and a pump core attached to the pump blade; a turbine runner that includes a turbine shell, a turbine blade attached to the turbine shell, and a turbine core attached to the turbine blade; and a stator that includes a stator blade, and rectifies a flow of a hydraulic fluid from the turbine runner to the pump impeller. The outer contour line of the turbine blade extends outward in an extending direction of a rotation center axis of the pump impeller and the turbine runner on the fluid outlet side of the turbine runner more than an outer contour line of the pump blade on the pump shell side.

14 Claims, 6 Drawing Sheets

FLUIDIC TORQUE TRANSFER DEVICE

INCORPORATION BY REFERENCE

The disclosure of Japanese Patent Application Nos. 2009-263901 and 2010-080836 filed on Nov. 19, 2009 and Mar. 31, 2010, respectively, including the specifications, drawings and abstracts are incorporated herein by reference in their entirety.

The present invention relates to a fluidic torque transfer device including: a pump impeller that includes a pump shell, pump blades, and a pump core; a turbine runner that includes a turbine shell, turbine blades, and a turbine core; and a stator that includes stator blades and rectifies a flow of a hydraulic fluid from the turbine runner to the pump impeller.

DESCRIPTION OF THE RELATED ART

Conventionally known fluidic torque transfer devices of this type include a torque converter that includes a front cover, a pump (a pump impeller) as a doughnut-shaped impeller fixed to the front cover, a turbine (a turbine runner) as a doughnut-shaped impeller having blades that face blades of the impeller, and a stator rotatably provided between the impeller and the turbine. The outer shapes of the pump impeller and the turbine runner in this type of torque converter are generally formed symmetrical to one another. However, in some torque converters, the outer shapes of the pump impeller and the turbine runner seem to be formed asymmetrical to one another (see Japanese Patent Application Publication No. JP-A-2007-132459, for example).

SUMMARY OF THE INVENTION

To downsize a fluidic torque transfer device such as a torque converter, simply reducing the size of the fluidic torque transfer device in which the outer shapes of the pump impeller and the turbine runner are symmetrical to one another also reduces the torque capacity of the fluidic torque transfer device. If the outer shapes of the pump impeller and the turbine runner are symmetrical to one another, a cross-sectional area of a flow path is smaller at a flow path outlet of the turbine than at a flow path inlet thereof, whereby flow separation occurs in some cases. Reducing the size of the fluidic torque transfer device in which the outer shapes of the pump impeller and the turbine runner are symmetrical to one another may promote the occurrence of such a flow separation problem, and thus further reduce the torque capacity. On the other hand, as with the torque converter described in Patent Document 1, there are torque converters in which the outer shapes of the pump impeller and the turbine runner seem to be formed asymmetrical to one another. Patent Document 1 does not disclose any method of designing the outer shapes, and it is not clear from the description of Patent Document 1 whether or not making the pump impeller and the turbine runner asymmetrical to one another contributes to downsizing of the fluid torque transfer device and to ensuring the torque capacity. Even if a contribution is made, such a satisfactory fluid transfer device in practical use cannot be obtained because no specific design method is disclosed. Thus, in fluidic torque transfer devices such as torque converters, it is not easy to ensure the torque capacity and downsize the device at the same time.

It is a main object of the present invention to downsize a fluidic torque transfer device while suppressing a reduction in torque capacity.

A fluidic torque transfer device of the present invention adopts the following means to achieve the above main object.

A fluidic torque transfer device according to the present invention is a fluidic torque transfer device including: a pump impeller that includes a pump shell, a pump blade attached to the pump shell, and a pump core attached to the pump blade; a turbine runner that includes a turbine shell, a turbine blade attached to the turbine shell, and a turbine core attached to the turbine blade; and a stator that includes a stator blade, and rectifies a flow of a hydraulic fluid from the turbine runner to the pump impeller. The fluidic torque transfer device is characterized in that an attachment angle of the turbine blade at a fluid outlet of the turbine runner is smaller than the attachment angle of the turbine blade at a fluid inlet of the turbine runner; a radius of an inscribed circle that is inscribed at the fluid outlet of the turbine runner on an outer contour line of the turbine blade on the turbine shell side and an inner contour line of the turbine blade on the turbine core side is larger than a radius of an inscribed circle that is inscribed at the fluid inlet of the turbine runner on the outer contour line and the inner contour line; and the outer contour line of the turbine blade extends outward in an extending direction of a rotation center axis of the pump impeller and the turbine runner on the fluid outlet side of the turbine runner more than an outer contour line of the pump blade on the pump shell side.

In this fluidic torque transfer device, the attachment angle of the turbine blade at the fluid outlet of the turbine runner is reduced to make it easier for the hydraulic fluid flowing out from the fluid outlet of the turbine runner to strike the stator blade of the stator, thereby improving torque amplification performance in a torque converter, especially the torque amplification performance when a vehicle starts off. In this fluidic torque transfer device, the radius of the inscribed circle that is inscribed at the fluid outlet of the turbine runner on the outer contour line of the turbine blade on the turbine shell side and the inner contour line of the turbine blade on the turbine core side is made larger than the radius of the inscribed circle that is inscribed at the fluid inlet of the turbine runner on the outer contour line and the inner contour line. Moreover, the outer contour line of the turbine blade is made to extend outward in the extending direction of the rotation center axis of the pump impeller and the turbine runner on the fluid outlet side of the turbine runner more than the outer contour line of the pump blade on the pump shell side. Thus, this fluidic torque transfer device has an asymmetrical structure in which the pump impeller is asymmetrical to the turbine runner, and an asymmetrical torus (an annular flow path) is formed by the pump impeller, the turbine runner, and the stator. With this structure, a sufficient cross-sectional area of a flow path defined between adjacent turbine blades can be ensured in a region on the fluid outlet side of the turbine runner, and a variation in the cross-sectional area of the fluid path from the fluid inlet to the fluid outlet of the turbine runner can be reduced. It is thus possible to suppress a reduction in the cross-sectional area of the flow path defined between adjacent turbine blades near the fluid outlet of the turbine runner, flow separation near the fluid outlet of the turbine runner, and a reduction in torque capacity, which result from reducing the attachment angle of the turbine blade at the fluid outlet of the turbine runner. At the same time, the turbine runner is not made to extend outward more than necessary, so the fluidic torque transfer device can be downsized.

The fluidic torque transfer device may be structured such that a length from a device centerline to a farthest portion located farthest from the device centerline in the extending direction of the rotation center axis of the turbine blade is longer than a length from the device centerline to a farthest portion located farthest from the device centerline in the extending direction of the rotation center axis of the pump blade, wherein the device centerline is a line that extends through a center between an outlet outer peripheral end of the pump blade and an inlet outer peripheral end of the turbine blade that face each other, extends through the rotation center axis of the pump impeller and the turbine runner, and extends perpendicular to the rotation center axis. This enables the outer contour line of the turbine blade to extend outward in the extending direction of the rotation center axis in a region on the fluid outlet side of the turbine runner more properly than the outer contour line of the pump blade, and a variation in the cross-sectional area of the flow path from the fluid inlet to the fluid outlet of the turbine runner can be reduced as much as possible.

The outer contour line of the turbine blade may be an outer edge on the turbine shell side in a projected image of the turbine blade formed when the turbine blade is projected onto a plane that includes the device centerline and the rotation center axis in a state where the fluid outlet outer peripheral end faces the fluid inlet outer peripheral end. The inner contour line of the turbine blade may be an inner edge on the turbine core side in the projected image formed when the turbine blade is projected onto the plane. The outer contour line of the pump blade may be an outer edge on the pump shell side in a projected image of the pump blade formed when the pump blade is projected onto the plane.

A difference between an attachment angle of the pump blade at a fluid inlet of the pump impeller and the attachment angle of the pump blade at a fluid outlet of the pump impeller may be smaller than a difference between the attachment angle of the turbine blade at the fluid inlet of the turbine runner and the attachment angle of the turbine blade at the fluid outlet of the turbine runner. That is, since the pump impeller pumps the hydraulic oil from the turbine runner to supply the pumped hydraulic oil again to the turbine runner, there is no need to make the attachment angle of the pump blade like the attachment angle of the turbine blade. Thus, by making the difference between the attachment angle of the pump blade at the fluid inlet of the pump impeller and the attachment angle of the pump blade at the fluid outlet of the pump impeller smaller than the difference between the attachment angle of the turbine blade at the fluid inlet of the turbine runner and the attachment angle of the turbine blade at the fluid outlet of the turbine runner, the variation in the cross-sectional area of the flow path defined between adjacent pump blades can be further reduced. This eliminates the need to extend the pump impeller outward like the turbine runner, and therefore the fluidic torque transfer device can be even further downsized.

Moreover, the outer contour line of the turbine blade may have a symmetrical region where the outer contour line of the turbine blade is symmetrical to the outer contour line of the pump blade, and an asymmetrical region where the outer contour line of the turbine blade is not symmetrical to the outer contour line of the pump blade, wherein the symmetrical region may include the fluid inlet outer peripheral end of the turbine blade, and the asymmetrical region may include a fluid outlet inner peripheral end of the turbine blade. This enables the hydraulic fluid to smoothly flow from the pump impeller into the turbine runner, whereby the torque transfer loss can be reduced.

When the pump blade and the turbine blade are projected onto the plane that includes the device centerline and the rotation center axis of the pump impeller and the turbine runner in the state where the outlet outer peripheral end faces the inlet outer peripheral end, each of the projected image of the pump blade and the projected image of the turbine blade may include at least one curvature change point in an outer edge portion on the pump shell side or the turbine shell side. A projected turbine outer edge portion, which is the outer edge portion on the turbine shell side extending with a constant curvature from the curvature change point on an outermost peripheral side in the projected image of the turbine blade, may have a smaller radius of curvature than a projected pump outer edge portion, which is the outer edge portion on the pump shell side extending with a constant curvature from the curvature change point on an outermost peripheral side in the projected image of the pump blade. A curvature center of the projected turbine outer edge portion may be located closer to the rotation center axis side than a curvature center of the projected pump outer edge portion. Thus, the length from the device centerline to a farthest point located farthest from the device centerline in the extending direction of the rotation center axis of the turbine blade can be made longer than the length from the device centerline to a farthest point located farthest from the device centerline in the extending direction of the rotation center axis of the pump blade. Since a sufficient cross-sectional area of the flow path defined between adjacent turbine blades of the turbine runner can be ensured in a center portion between the turbine inlet and the turbine outlet, the occurrence of flow separation in the center portion of the flow path can be suppressed, and the torque transfer loss can be reduced.

Moreover, an $n^{th}$ (where "n" is an integer of 2 or more) projected turbine outer edge portion, which is the outer edge portion on the turbine shell side extending from an $n^{th}$ curvature change point from an outer peripheral side in the projected image of the turbine blade to an $(n+1)^{th}$ curvature change point or the fluid outlet inner peripheral end in the projected image of the turbine blade, may have a smaller radius of curvature than an $n^{th}$ projected pump outer edge portion, which is the outer edge portion on the pump shell side extending from an $n^{th}$ curvature change point from an outer peripheral side in the projected image of the pump blade to an $(n+1)^{th}$ curvature change point or an inlet inner peripheral end in the projected image of the pump blade. A curvature center of the $n^{th}$ projected turbine outer edge portion may be located closer to the rotation center axis side than a curvature center of the $n^{th}$ projected pump outer edge portion. Thus, a reduction in the cross-sectional area of the flow path defined between adjacent turbine blades of the turbine runner toward the turbine outlet can be suppressed, whereby the occurrence of flow separation on the turbine outlet side of the flow path can be suppressed, and the torque transfer loss can be reduced.

In the fluidic torque transfer device, a difference between a rotation radius of the pump blade and the turbine blade and a rotation radius of an outer peripheral end of the stator blade may be less than half of a difference between the rotation radius of the pump blade and the turbine blade and a rotation radius of an inner peripheral end of the stator blade. Thus, the cross-sectional area on the turbine outlet side of the flow path defined between adjacent turbine blades of the turbine runner can be further increased.

DETAILED DESCRIPTION OF THE EMBODIMENT

A mode for carrying out the present invention will be described below based on an embodiment.

Figure 1:
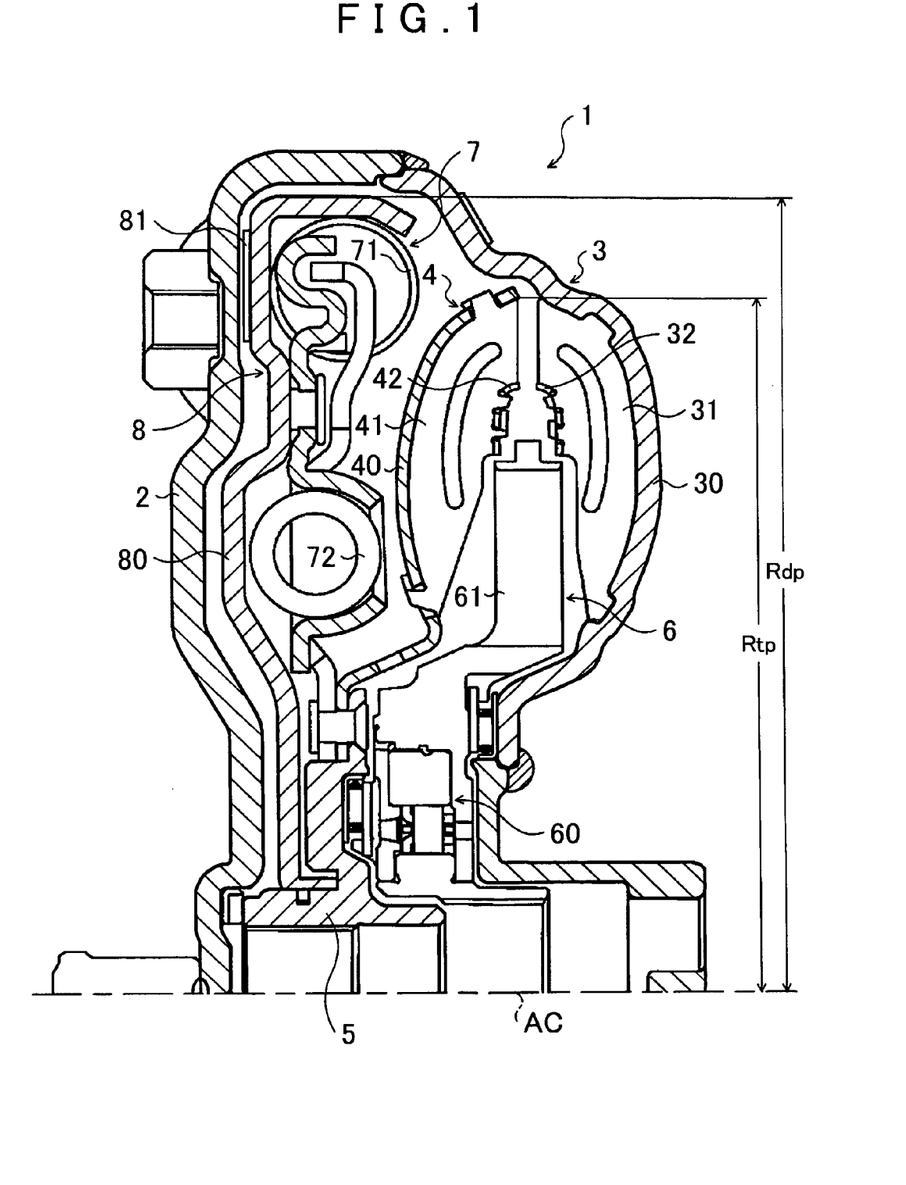
FIG. 1 is a schematic structural diagram of a torque converter 1 as a fluidic torque transfer device according to an embodiment of the present invention.

FIG. 1 is a schematic structural diagram of a torque converter 1 as a fluidic torque transfer device according to an embodiment of the present invention. The torque converter 1 shown in the figure is applied to a vehicle that includes an engine, and as shown in FIG. 1, the torque converter 1 includes a front cover (an input member) 2, a pump impeller (a fluid transmission element) 3, a turbine runner (a fluid transmission element) 4, a turbine hub (an output member) 5, a stator 6, a damper unit 7, and a lockup clutch mechanism 8. A rotation shaft of the engine, not shown, is fixed to the front cover 2. An input shaft (not shown) of an automatic transmission (AT) or a continuously variable transmission (CVT), not shown, is fixed (spline-fitted) to the turbine hub 5.

The pump impeller 3 has a pump shell 30, a plurality of pump blades 31 attached (fixed) to the inner surface of the pump shell 30, and a pump core 32 attached (fixed) to the inner edges of the pump blades 31. The pump shell 30 is closely fixed to the front cover 2. The turbine runner 4 has a turbine shell 40, a plurality of turbine blades 41 attached (fixed) to the inner surface of the turbine shell 40, and a turbine core 42 attached (fixed) to the inner edges of the turbine blades 41. The turbine shell 40 is fixed to the turbine hub 5. The pump impeller 3 on the front cover 2 side faces the turbine runner 4 on the turbine hub 5 side, and the stator 6 having a plurality of stator blades 61 capable of rotating coaxially with the front cover 2 is arranged between the pump impeller 3 and the turbine runner 4. The stator 6 has a one-way clutch 60 that sets the rotation direction of the stator 6 to only one direction. The pump impeller 3, the turbine runner 4, and the stator 6 form a torus (an annular flow path) that circulates hydraulic oil (hydraulic fluid). The stator 6 rectifies the flow of the hydraulic oil from a turbine outlet that is a fluid outlet of the turbine runner 4 to a pump inlet that is a fluid inlet of the pump impeller. The damper unit 7 has a plurality of springs 71 and a plurality of springs 72, and together with the turbine shell 40, is fixed to the turbine hub 5. The lockup clutch mechanism 8 includes a lockup piston 80, and a friction plate 81 bonded to the surface of the lockup piston 80.

In the torque converter 1 thus structured, when the engine, not shown, is operated, and the front cover 2 and the pump impeller 3 rotate, the flow of the hydraulic oil from a pump outlet on the outer peripheral side of the pump impeller 3 to a turbine inlet on the outer peripheral side of the turbine runner 4 forces the turbine runner 4 to start rotating, and the power from the engine is transmitted from the front cover 2 to the turbine hub 5 via the turbine runner 4 (the hydraulic oil). When the difference in rotational speed between the pump impeller 3 and the turbine runner 4 is large, the stator 6 switches the flow of the hydraulic oil to a direction that assists rotation of the pump impeller 3. Thus, the torque converter 1 operates as a torque amplifier when the difference in rotational speed between the pump impeller 3 and the turbine runner 4 is large. As the difference in rotational speed therebetween decreases, the stator 6 runs idle via the one-way clutch 60, and thus operates as a fluid coupling. If predetermined conditions are satisfied (e.g., if the vehicle speed reaches a predetermined value) after the vehicle starts off, the lockup clutch mechanism 8 is operated, and the power transmitted from the engine to the front cover 2 is directly transmitted to the turbine hub 5 as the output member, whereby the engine is mechanically directly coupled to the input shaft of the transmission. Fluctuations in the torque that is transmitted from the front cover 2 to the turbine hub 5 are absorbed by the damper unit 7.

Here, in the torque converter 1 of the embodiment, the number of pump blades 31 of the pump impeller 3 is different from the number of turbine blades 41 of the turbine runner 4 in order to suppress the occurrence of unexpected resonances (e.g., the number of pump blades 31 is slightly more than the number of turbine blades 41 in order to increase the amount of hydraulic oil that is raked up). The attachment angle of each turbine blade 41 to the turbine shell 40 (the angle of the flow immediately after the hydraulic oil flows into the blades) is set to be smaller (somewhat more acute) than the attachment angle of each pump blade 31 to the pump shell 30, and torsion is applied to each turbine blade 41. In the embodiment, the difference between the attachment angle of the pump blades 31 at the pump inlet and the attachment angle of the pump blades 31 at the pump outlet is set to be smaller than the difference between the attachment angle of the turbine blades 41 at the turbine inlet and the attachment angle of the turbine blades 41 at the turbine outlet. Moreover, the average value (the average value from the pump inlet to the pump outlet) of the attachment angle of the pump blades 31 in the pump impeller 3 is set to be larger than the average value (the average value from the pump inlet to the pump outlet) of the attachment angle of the turbine blades 41 in the turbine runner 4.

Figure 2:
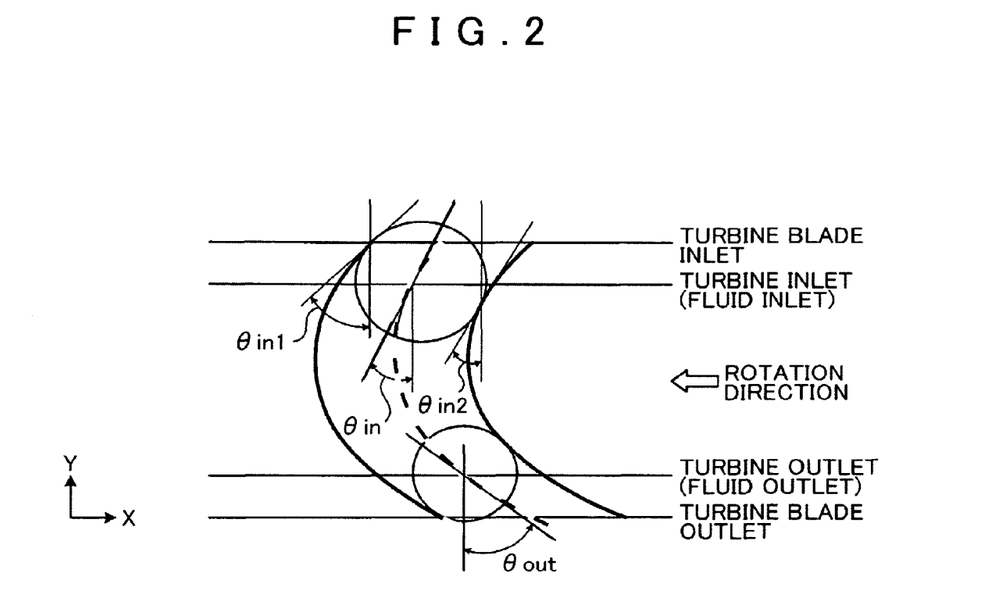
FIG. 2 is an explanatory diagram that illustrates an attachment angle of turbine blades.

Note that the attachment angle of the turbine blades can be obtained as shown in FIG. 2. That is, the attachment angle ($\theta$in) at the turbine inlet (the fluid inlet) is expressed as $$\theta\text{in}=(\theta\text{in}1+\theta\text{in}2)/2$$

where, $\theta$in1 represents an angle that is formed by a tangent from a turbine blade inlet endpoint with respect to a perpendicular in the Y direction, and $\theta$in2 represents an angle that is formed by a tangent to a point of contact between an adjacent blade and an inscribed circle with respect to a perpendicular in the Y direction when the inscribed circle contacting a blade outer contour line adjacent to the turbine blade inlet endpoint is drawn. The attachment angle ($\theta$out) at the turbine outlet (the fluid outlet) is expressed as $$\theta\text{out}=(\theta\text{out}1+\theta\text{out}2)/2$$

where, $\theta$out1 represents an angle that is formed by a tangent from a turbine blade outlet endpoint with respect to a perpendicular in the Y direction, and $\theta$out2 represents an angle that is formed by a tangent to a point of contact between an adjacent blade and an inscribed circle with respect to a perpendicular in the Y direction when the inscribed circle contacting a blade outer contour line adjacent to the turbine blade outlet endpoint is drawn. The attachment angle of the turbine blades at the turbine outlet being smaller than that of the turbine blades at the turbine inlet means that the absolute value of θout is smaller than the absolute value of θin.

Moreover, in the embodiment, the attachment angle of each turbine blade 41 at the turbine outlet that is the fluid outlet of the turbine runner 4 is set to be smaller than the attachment angle of each turbine blade 41 at the turbine inlet that is the fluid inlet of the turbine runner 4, in order to make it easier for the hydraulic oil flowing out from the fluid outlet of the turbine runner 4 to strike the stator blades 61 of the stator 6. The pump impeller 3 and the turbine runner 4 are formed so as to have slightly smaller diameters compared to a conventional torque converter, and configure a torus that is flattened compared to the conventional torque converter. Thus, the torque converter 1 of the embodiment is made compact as a whole, and a sufficient amount of space for mounting the damper unit 7 can be secured. However, if the attachment angle of each turbine blade 41 at the turbine outlet is reduced, and the pump impeller 3 and the turbine runner 4 are flattened and the diameters thereof are reduced as described above, the cross-sectional area of the flow path defined between adjacent turbine blades 41 is reduced near the turbine outlet, which can reduce the torque capacity, and in some cases, cause flow separation near the turbine outlet.

Figure 3:
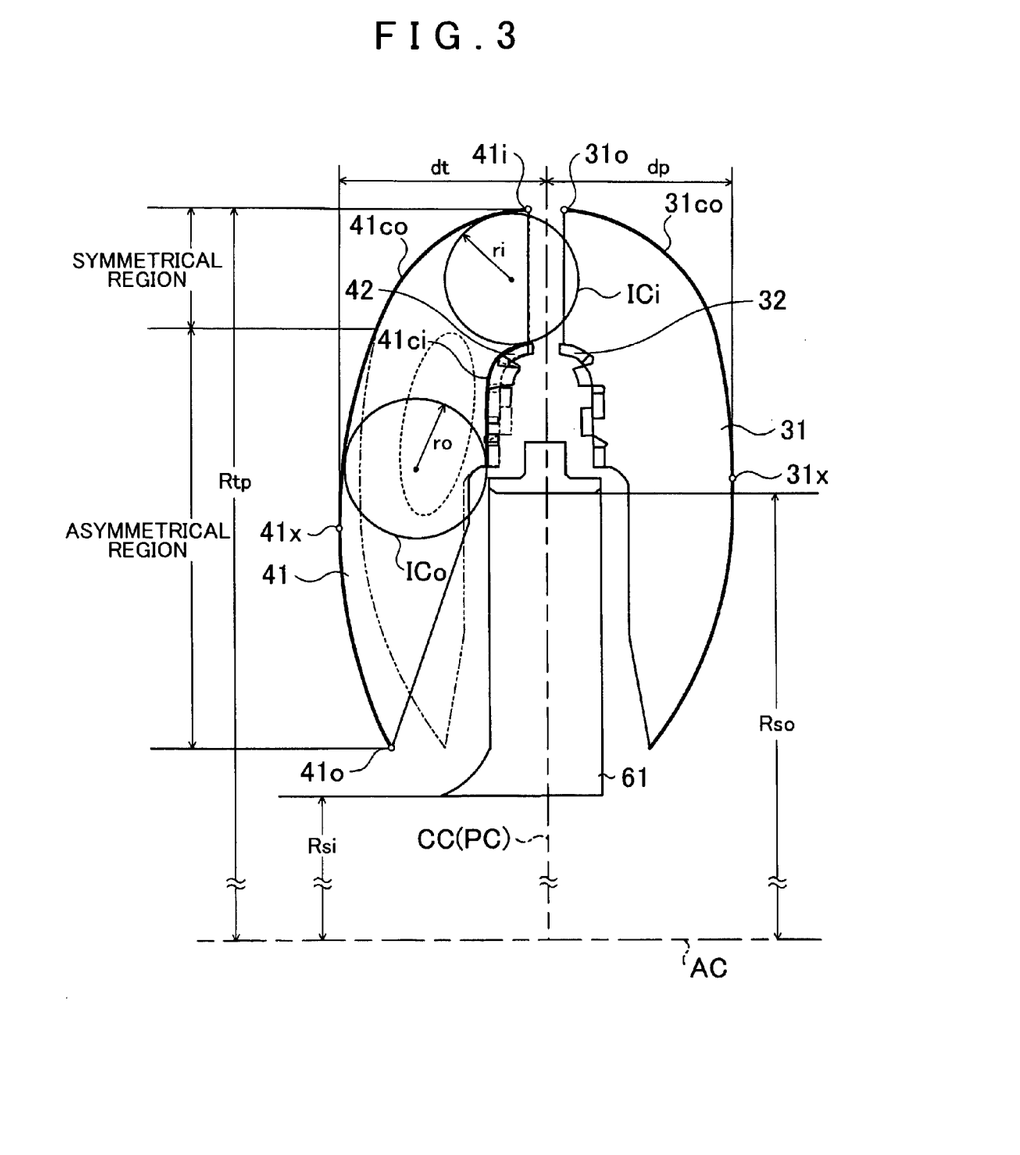
FIG. 3 is a schematic diagram for illustrating the structure of the torque converter 1.

Thus, as shown in FIG. 3, the turbine runner 4 that forms the torque converter 1 of the embodiment is structured such that a radius ro of an inscribed circle ICo that is inscribed on an outer contour line 41co of the turbine blade 41 on the turbine shell 40 side and an inner contour line 41ci of the turbine blade 41 (the inner peripheral end of the inner contour line 41ci) on the turbine core 42 side at the turbine outlet (the fluid outlet) is larger than a radius ri of an inscribed circle ICi that is inscribed on the outer contour line 41co and the inner contour line 41ci (the outer peripheral end of the inner contour line 41ci) at the turbine inlet (the fluid inlet), and such that the outer contour line 41co of the turbine blade 41 extends outward in the extending direction of a rotation center axis AC of the pump impeller 3 and the turbine runner 4 on the turbine outlet side more than an outer contour line 31co of the pump blade 31 on the pump shell 30 side. That is, the torque converter 1 of the embodiment has an asymmetrical structure in which the pump impeller 3 and the turbine runner 4 are asymmetrical to one another.

Moreover, as shown in FIG. 3, a straight line that extends through the rotation center axis AC and the midpoint (the center) between an outlet outer peripheral end 31o of any of the pump blades 31 and an inlet outer peripheral end 41i of any of the turbine blades 41 when the outlet outer peripheral end 31o faces the inlet outer peripheral end 41i, and that extends perpendicular to the rotation center axis AC is defined as a "device centerline CC." If the device centerline CC is defined as described above, the outer contour line 41co of the turbine blade 41 is the outer edge on the turbine shell 40 side in a projected image of the turbine blade 41 formed when the turbine blade 41 is projected onto a plane that includes the device centerline CC and the rotation center axis AC, in the state where the outlet outer peripheral end 31o faces the inlet outer peripheral end 41i. The inner contour line 41ci of the turbine blade is the inner edge on the turbine core 42 side in the projected image of the turbine blade 41 formed when the turbine blade 41 is projected onto the plane that includes the device centerline CC and the rotation center axis AC. Moreover, the outer contour line 31co of the pump blade 31 is the outer edge on the pump shell 30 side in a projected image of the pump blade 31 formed when the pump blade 31 is projected onto the plane that includes the device centerline CC and the rotation center axis AC.

In the embodiment, as shown in FIG. 3, a length dt from the device centerline CC to a farthest point (a farthest portion) 41x of the corresponding turbine blade 41 located farthest from the device centerline CC in the extending direction of the rotation center axis AC is made longer than a length dp from the device centerline CC to a farthest point (a farthest portion) 31x of the corresponding pump blade 31 located farthest from the device centerline CC in the extending direction of the rotation center axis AC, so that the outer contour line 41co of the turbine blade 41 extends outward in the extending direction of the rotation center axis AC on the turbine outlet side more than the outer contour line 31co of the pump blade 31 on the pump shell 30 side. If a plane that includes the midpoint between the outlet outer peripheral end 31o and the inlet outer peripheral end 41i and extends perpendicular to the rotation center axis AC is defined as a device center plane PC, the distance (=dt) from the device center plane PC to the farthest point 41x of each turbine blade 41 is longer than the distance (=dp) from the device center plane PC to the farthest point 31x of each pump blade 31. Thus, the distance (=dt) from the device center plane PC to the most inward portion of the inner surface of the turbine shell 40 is longer than the distance (=dp) from the device center plane PC to the most inward portion of the inner surface of the pump shell 30.

That is, the turbine runner 4 included in the torque converter 1 of the embodiment is expanded (extended) outward and in the extending direction of the rotation center axis AC in a region from near the center portion between the turbine inlet and the turbine outlet to the turbine outlet, as compared to a case in which the turbine runner 4 is formed so as to be generally symmetrical to the pump impeller 3 (see the two-dotted chain line in FIG. 3). Thus, the torque converter 1 has a torus that is asymmetrical to respect to the device centerline CC (the device center plane PC). In addition, in the torque converter 1 of the embodiment, as shown in FIG. 3, the dimensions of the pump impeller 3, the turbine runner 4, the stator 6, and the like are determined such that the difference (Rtp−Rso) between a radius Rtp of rotation of the pump blades 31 and the turbine blades 41 and a radius Rso of rotation of the outer peripheral ends of the stator blades 61 is less than half of the difference (Rtp−Rsi) between the radius Rtp of rotation of the pump blades 31 and the turbine blades 41 and a radius Rsi of rotation of the inner peripheral ends of the stator blades 61.

Figure 4:
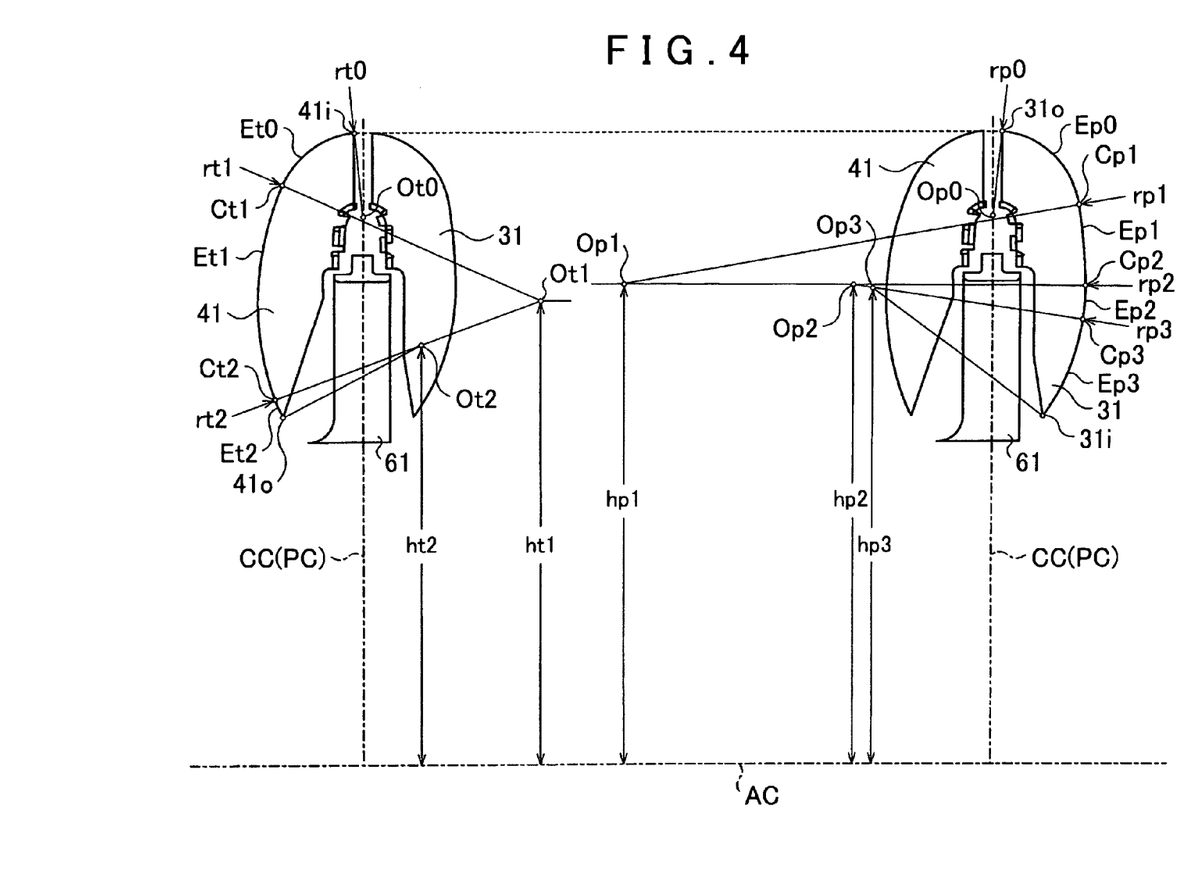
FIG. 4 is a schematic diagram for illustrating the structure of the torque converter 1.

The torque converter 1 of the embodiment will be described in more detail below with reference to FIG. 4. As shown in the figure, when a pair of the pump blade 31 and the turbine blade 41, whose outlet outer peripheral end 31o and inlet outer peripheral end 41i face each other, are projected onto a plane that includes the device centerline CC and the rotation center axis AC of the pump impeller 3 and the turbine runner 4, the projected image of the pump blade 31 of the embodiment includes three curvature change points Cp1, Cp2, and Cp3 on the outer edge portion of the pump shell 30 side, and the projected image of the turbine blade 41 of the embodiment includes two curvature change points Ct1 and Ct2 on the outer edge portion of the turbine shell 40 side. Thus, three curvature change points corresponding to the curvature change points Cp1, Cp2, and Cp3 are included in the cross section (the shell inner periphery) of the pump shell 30 obtained when the pump shell 30 is cut along a plane that includes the rotation center axis AC, and two curvature change points corresponding to the curvature change points Ct1 and Ct2 are included in the cross section (the shell inner periphery) of the turbine shell 40 obtained when the turbine shell 40 is cut along the plane that includes the rotation center axis AC.

In the embodiment, the radius of a curvature rt0 of a zeroth projected turbine outer edge portion Et0, which is an outer edge portion on the turbine shell 40 side extending from the inlet outer peripheral end 41$i$ to the curvature change point Ct1 on the outermost peripheral side in the projected image of the turbine blade 41, has the same value as a radius of curvature rp0 of a zeroth projected pump outer edge portion Ep0, which is an outer edge portion on the pump shell 30 side extending from the outlet outer peripheral end 31$o$ to the curvature change point Cp1 on the outermost peripheral side in the projected image of the pump blade 31. Curvature centers Ot0, Op0 of the radius of curvature rt0 and the radius of curvature rp0 match each other. Thus, the radius of curvature of the shell inner periphery from the point corresponding to the inlet outer peripheral end 41$i$ to the point corresponding to the curvature change point Ct1 in the cross section of the turbine shell 40 obtained when the turbine shell 40 is cut along the plane that includes the rotation center axis AC is the same as the radius of curvature of the shell inner periphery from the point corresponding to the outlet outer peripheral end 31$o$ to the point corresponding to the curvature change point Cp1 in the cross section of the pump shell 30 obtained when the pump shell 30 is cut along the plane that includes the rotation center axis AC. That is, as shown in FIG. 3, the outer contour line 41$co$ of the turbine blade 41 has a symmetrical region where the outer contour line 41$co$ of the turbine blade 41 is symmetrical to the outer contour line 31$co$ of the pump blade 31, and an asymmetrical region where the outer contour line 41$co$ of the turbine blade 41 is not symmetrical to the outer contour line 31$co$ of the pump blade 31. The inlet outer peripheral end 41$i$ of the turbine blade 41 is included in the symmetrical region, and an outlet inner peripheral end 41$o$ of the turbine blade 41 is included in the asymmetrical region. Note that curvature change points provided in order to (closely) bond the blades to the shell, for example, are not included among the "curvature change points on the outermost peripheral side" in the present invention.

A radius of curvature rt1 of a first projected turbine outer edge portion Et1, which is an outer edge portion on the turbine shell 40 side extending from the curvature change point Ct1 on the outermost peripheral side to the second curvature change point Ct2 from the outer peripheral side in the projected image of the turbine blade 41, is smaller than a radius of curvature rp1 of a first projected pump outer edge portion Ep1, which is an outer edge portion on the pump shell 30 side extending from the curvature change point Cp1 on the outermost peripheral side to the second curvature change point Cp2 from the outer peripheral side in the projected image of the pump blade 31. A curvature center Ot1 of the first projected turbine outer edge portion Et1 is located closer to the rotation center axis AC side than a curvature center Op1 of the first projected pump outer edge portion Ep1. Moreover, a radius of curvature rt2 of a second projected turbine outer edge portion Et2, which is an outer edge portion on the shell side extending from the second curvature change point Ct2 from the outer peripheral side in the projected image of the turbine blade 41 to the outlet inner peripheral end 41$o$ in this projected image, is smaller than a radius of curvature rp2 of a second projected pump outer edge portion Ep2, which is an outer edge portion on the shell side extending from the second curvature change point Cp2 to the third curvature change point Cp3 from the outer peripheral side in the projected image of the pump blade 31. A curvature center Ot2 of the second projected turbine outer edge portion Et2 is located closer to the rotation center axis AC side than a curvature center Op2 of the second projected pump outer edge portion Ep2.

That is, in the torque converter 1 of the embodiment, an $n^{th}$ (where "n" is an integer of 1 or more) projected turbine outer edge portion Etn is an outer edge portion on the shell side extending from an $n^{th}$ curvature change point Ctn to an $(n+1)^{th}$ curvature change point Ctn+1 from the outer peripheral side in the projected image of the turbine blade 41 or to the outlet inner peripheral end 41$o$ in the projected image of the turbine blade 41. The radius of curvature of the $n^{th}$ projected turbine outer edge portion Etn is smaller than that of an $n^{th}$ projected pump outer edge portion Epn, which is an outer edge portion on the shell side extending from the $n^{th}$ curvature change point Cpn to the $(n+1)^{th}$ curvature change point Cpn+1 from the outer peripheral side in the projected image of the pump blade 31 or to an inlet inner peripheral end 31$i$ in the projected image of the pump blade 31. A curvature center Otn of the $n^{th}$ projected turbine outer edge portion Etn is located closer to the rotation center axis AC side than a curvature center Opn of the $n^{th}$ projected pump outer edge portion Epn. Thus, the length dt from the device centerline CC to the farthest point 41$x$ of the corresponding turbine blade 41 located farthest from the device centerline CC in the extending direction of the rotation center axis AC can be made longer than the length dp from the device centerline CC to the farthest point 31$x$ of the corresponding pump blade 31 located farthest from the device centerline CC in the extending direction of the rotation center axis AC. Moreover, the radius of curvature of the shell inner periphery from the point corresponding to the $n^{th}$ curvature change point Ctn in the cross section of the turbine shell 40 obtained when the turbine shell 40 is cut along the plane that includes the rotation center axis AC, to the point corresponding to the $(n+1)^{th}$ curvature change point Ctn+1 or the outlet inner peripheral end 41$o$ in the projected image of the turbine blade 41, is smaller than the radius of curvature of the shell inner periphery from the point corresponding to the $n^{th}$ curvature change point Cpn in the cross section of the pump shell 30 obtained when the pump shell 30 is cut along the plane that includes the rotation center axis AC, to the point corresponding to the $(n+1)^{th}$ curvature change point Cpn+1 or the inlet inner peripheral end 31$i$ in the projected image of the pump blade 31. Furthermore, the curvature center of the shell inner periphery from the point corresponding to the curvature change point Ctn in the cross section of the turbine shell 40 obtained when the turbine shell 40 is cut along the plane that includes the rotation center axis AC, to the point corresponding to the $(n+1)^{th}$ curvature change point Ctn+1 or the outlet inner peripheral end 41$o$, is located closer to the rotation center axis AC side than the curvature center of the shell inner periphery from the point corresponding to the curvature change point Cpn in the cross section of the pump shell 30 obtained when the pump shell 30 is cut along the plane that includes the rotation center axis AC, to the point corresponding to the $(n+1)^{th}$ curvature change point Cpn+1 or the outlet inner peripheral end 41$o$.

Note that in the torque converter 1 of the embodiment, the radius of curvature rt2 of the second projected turbine outer edge portion Et2, which is the outer edge portion on the shell side extending from the second (the innermost peripheral side) curvature change point Ct2 from the outer peripheral side in the projected image of the turbine blade 41 to the outlet inner peripheral end 41$o$ in this projected image, is smaller than a radius of curvature rp3 of a third projected pump outer edge portion Ep3, which is an outer edge portion on the shell side extending from the third (the innermost peripheral side)

curvature change point Cp3 from the outer peripheral side in the projected image of the pump blade 31 to the inlet inner peripheral end 31*i* in this projected image. The curvature center Ot2 of the second projected turbine outer edge portion Et2 is located closer to the rotation center axis AC side than a curvature center Op3 of the third projected pump outer edge portion Ep3. Thus, the cross-sectional area on the turbine outlet side of the flow path defined between adjacent turbine blades 41 of the turbine runner 4 can be further increased.

Figure 5:
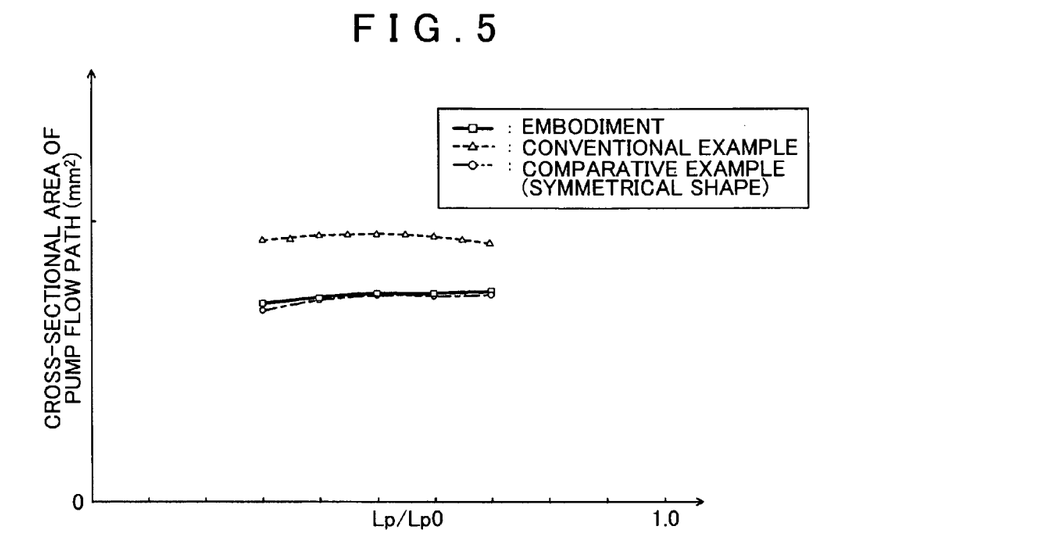
FIG. 5 is a graph that shows a cross-sectional area of a flow path defined between adjacent pump blades of a pump impeller included in the torque converter 1 of the embodiment, a torque converter of a conventional example, and a torque converter of a comparative example.
Figure 6:
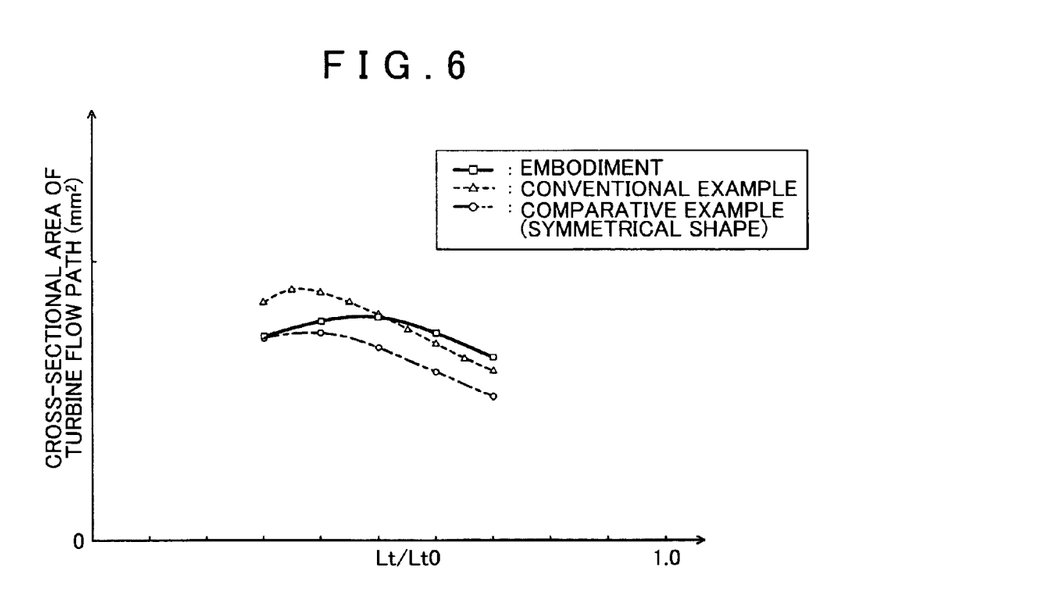
FIG. 6 is a graph that shows the cross-sectional area of a flow path defined between adjacent turbine blades of a turbine runner included in the torque converter 1 of the embodiment, the torque converter of the conventional example, and the torque converter of the comparative example.

FIG. 5 is a graph that shows the cross-sectional area of the flow path defined between adjacent pump blades of the pump impeller included in the torque converter 1 of the embodiment structured as described above, a torque converter of a conventional example, and a torque converter of a comparative example. FIG. 6 is a graph that shows the cross-sectional area of the flow path defined between adjacent turbine blades of the turbine runner included in the torque converter 1 of the embodiment, the torque converter of the conventional example, and the torque converter of the comparative example. Note that the horizontal axis in FIG. 5 represents a ratio Lp/Lp0 of a flow path length Lp from the pump inlet to a total flow path length Lp0 from the pump inlet to the pump outlet, and the horizontal axis in FIG. 6 represents a ratio Lt/Lt0 of a flow path length Lt from the turbine inlet to a total flow path length Lt0 from the turbine inlet to the turbine outlet. Here, the torque converter of the conventional example includes a pump impeller having a slightly larger outer diameter and a lower flatness than the pump impeller 3, and a turbine runner structured so as to be generally symmetrical to this pump impeller. The torque converter of the conventional example includes the same pump impeller as the pump impeller 3, and a turbine runner structured so as to be generally symmetrical to this pump impeller.

As evident from FIG. 5, since the pump impeller included in the torque converter of the conventional example has a slightly larger outer diameter and a lower flatness, the cross-sectional area of the flow path defined between adjacent pump blades is larger in the entire region from the pump inlet to the pump outlet than for the pump impellers included in the torque converters of the embodiment and the comparative example. In each of the torque converter 1 of the embodiment, the torque converter of the conventional example, and the torque converter of the comparative example, the cross-sectional area of the flow path defined between adjacent pump blades of the pump impeller is generally constant from the pump inlet to the pump outlet.

On the other hand, as evident from FIG. 6, in the turbine runners of the conventional example and the comparative example manufactured according to conventional design methods, the cross-sectional area of the flow path defined between adjacent turbine blades basically decreases from the turbine inlet toward the turbine outlet. However, in the turbine runner included in the torque converter 1 of the embodiment, a variation in the cross-sectional area of the flow path defined between adjacent turbine blades from the turbine inlet to the turbine outlet is smaller than the other turbine runners, and generally the same cross-sectional area of the flow path as that of the conventional example is ensured in the region from near the center between the turbine inlet and the turbine outlet to the turbine outlet. Thus, the torque converter 1 of the embodiment can suppress the occurrence of flow separation in the center portion of the flow path from the turbine inlet to the turbine outlet (the region surrounded by the dashed line in FIG. 3), and the occurrence of flow separation on the turbine outlet side of the flow path, thus reducing the torque transfer loss.

Figure 7:
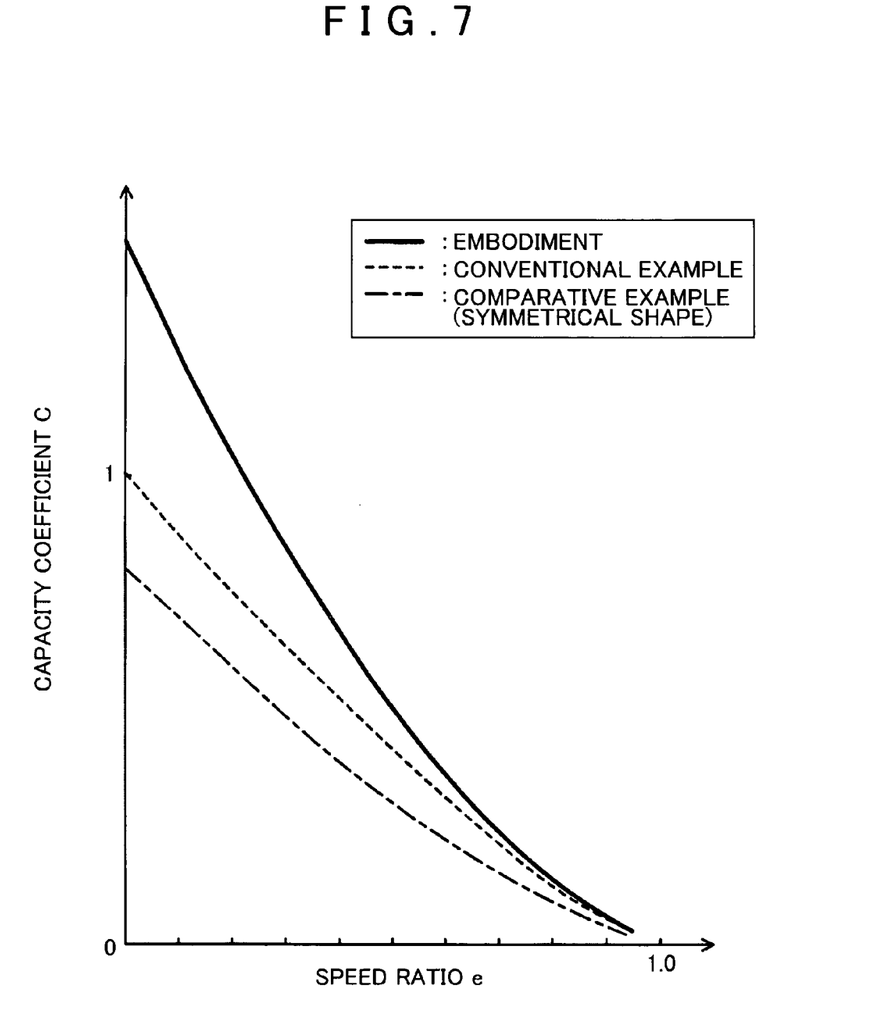
FIG. 7 is a graph that shows the relation between a speed ratio e of the pump impeller and the turbine runner, and a capacity coefficient C of the torque converter 1 of the embodiment, the torque converter of the conventional example, and the torque converter of the comparative example.

FIG. 7 shows the relation between a speed ratio e of the pump impeller and the turbine runner, and a capacity coefficient C of the torque converter 1 of the embodiment, the torque converter of the conventional example, and the torque converter of the comparative example. In the figure, the capacity coefficients C of the torque converters of the embodiment and the comparative example are shown as values calculated by setting the capacity coefficient C of the torque converter of the conventional example to a value of 1. As evident from the figure, a reduction in torque capacity cannot be avoided by simply flattening (and reducing the diameters of) the pump impeller and the turbine runner (see the comparative example). However, as in the embodiment, a performance (a torque capacity) higher than that of the conventional torque converter can be obtained by expanding (extending) the turbine runner, especially the region from near the center between the turbine inlet and the turbine outlet to the turbine outlet, outward and in the extending direction of the rotation center axis of the torque converter to form an asymmetrical torus.

As described above, in the torque converter 1 of the embodiment, the attachment angle of the turbine blades 41 at the turbine outlet that is the fluid outlet of the turbine runner 4 is smaller than the attachment angle of the turbine blades 41 at the turbine inlet that is the fluid inlet of the turbine runner 4. Moreover, the radius ro of the inscribed circle ICo that is inscribed on the outer contour line 41*co* of the turbine blade 41 on the turbine shell 40 side and the inner contour line 41*ci* of the turbine blade 41 on the turbine core 42 side at the turbine outlet is larger than the radius ri of the inscribed circle ICi that is inscribed on the outer contour line 41*co* and the inner contour line 41*ci* at the turbine inlet. The outer contour line 41*co* of the turbine blade 41 extends outward in the extending direction of the rotation center axis AC on the turbine outlet side more than the outer contour line 31*co* of the pump blade 31 on the pump shell 30 side.

Thus, the attachment angle of the turbine blades 41 at the turbine outlet is made smaller than the attachment angle of the turbine blades 41 at the turbine inlet. This makes it easier for the hydraulic oil flowing out from the turbine runner 4 to strike the stator blades 61 of the stator 6, whereby torque amplification performance can be improved. Moreover, the radius ro of the inscribed circle ICo inscribed on the outer contour line 41*co* and the inner contour line 41*ci* of the turbine blade 41 at the turbine outlet is made larger than the radius ri of the inscribed circle ICi inscribed on the outer contour line 41*co* and the inner contour line 41*ci* at the turbine inlet. The outer contour line 41*co* of the turbine blade 41 is made to extend outward in the extending direction of the rotation center axis AC on the turbine outlet side more than the outer contour line 31*co* of the pump blade 31 on the pump shell 30 side. Thus, even if the attachment angle of the turbine blades 41 at the turbine outlet is reduced and the torus is flattened, a sufficient cross-sectional area of the flow path defined between adjacent turbine blades 41 can be ensured in the region on the turbine outlet side, whereby a variation in the cross-sectional area of the flow path from the turbine inlet to the turbine outlet can be reduced. Thus, in the torque converter 1 of the embodiment, the torque amplification performance can be improved and the overall device can be downsized, while suppressing a reduction in torque capacity and suppressing flow separation near the turbine outlet.

The torque converter 1 of the embodiment described above is highly preferable for a vehicle in which lockup is performed by the lockup clutch mechanism 8 at a very low vehicle speed of approximately 10 km/h, for example. That is, by mounting on such a vehicle the torque converter 1 capable of suppressing a reduction in torque capacity and improving the torque amplification performance, a required torque capacity is reduced, whereby a rotation radius Rtp of the pump blades 31 and the turbine blades 41 can be made significantly smaller than a rotation radius Rdp of the damper unit 7 (see FIG. 1) within a range that can ensure the torque amplification performance. As a consequence, the overall torque converter 1, and thus the overall transmission can be downsized.

Regarding the pair of the pump blade 31 and the turbine blade 41, the length dt from the device centerline CC to the farthest point 41x located farthest from the device centerline CC in the extending direction of the rotation center axis AC of the turbine blade 41 is made larger than the length dp from the device centerline CC to the farthest point 31x located farthest from the device centerline CC in the extending direction of the rotation center axis AC of the pump blade 31. This enables the outer contour line 41co of the turbine blade 41 to extend outward in the extending direction of the rotation center axis AC in the region on the turbine outlet side more properly than the outer contour line 31co of the pump blade 31, and a variation in the cross-sectional area of the flow path from the turbine inlet to the turbine outlet can be reduced as much as possible, even if the torus, namely, the pump impeller 3 and the turbine runner 4, is flattened and reduced in diameter, and the attachment angle of the turbine blade 41 is made smaller than that of the pump blade 31.

Moreover, since the pump impeller 3 pumps the hydraulic oil from the turbine runner 4 to supply the pumped hydraulic oil again to the turbine runner 4, there is no need to make the attachment angle of the pump blades 31 small like the attachment angle of the turbine blades 41. Thus, by making the difference between the attachment angle of the pump blades 31 at the pump inlet and the attachment angle of the pump blades 31 at the pump outlet smaller than the difference between the attachment angle of the turbine blades 41 at the turbine inlet and the attachment angle of the turbine blades 41 at the turbine outlet, the variation in the cross-sectional area of the flow path defined between adjacent pump blades 31 can be further reduced. This eliminates the need to extend the pump impeller 3 outward like the turbine runner 4, and therefore the torque converter 1 can be even further downsized.

In the torque converter 1 of the embodiment, when the pump blade 31 and the turbine blade 41 are projected onto the plane that includes the device centerline CC and the rotation center axis AC of the pump impeller 3 and the turbine runner 4 in the state where the outlet outer peripheral end 31o of the pump blade 31 faces the inlet outer peripheral end 41i of the turbine blade 41, the first projected turbine outer edge portion Et1, which is the outer edge portion on the turbine shell 40 side extending with a constant curvature from the curvature change point Ct1 on the outermost peripheral side in the projected image of the turbine blade 41, has a smaller radius of curvature than the first projected pump outer edge portion Ep1, which is the outer edge portion on the pump shell 30 side extending with a constant curvature from the curvature change point Cp1 on the outermost peripheral side in the projected image of the pump blade 31 (rt1<rp1). The curvature center Ot1 of the first projected turbine outer edge portion Et1 is located closer to the rotation center axis AC side than the curvature center Opt of the first projected pump outer edge portion Ep1. Thus, the length dt from the device centerline CC to the farthest point 41x located farthest from the device centerline CC in the extending direction of the rotation center axis AC of the turbine blade 41 can be made longer than the length dp from the device centerline CC to the farthest point 31x located farthest from the device centerline CC in the extending direction of the rotation center axis AC of the pump blade 31. Since a sufficient cross-sectional area of the flow path defined between adjacent turbine blades 41 of the turbine runner 4 can be ensured in the center portion between the turbine inlet and the turbine outlet, the occurrence of flow separation in the center portion of the flow path can be suppressed, and the torque transfer loss can be reduced. Note that the difference (rp1−rt1) between the radius of curvature rp1 of the first projected pump outer edge portion Ep1 and the radius of curvature rt1 of the first projected turbine outer edge portion Et1 is preferably 30 to 40 mm, for example.

Moreover, in the torque converter 1 of the embodiment, the second projected turbine outer edge portion Et2, which is the outer edge portion on the turbine shell 40 side extending from the second curvature change point Ct2 from the outer peripheral side in the projected image of the turbine blade 41 to the outlet inner peripheral end 41o in this projected image, has a smaller radius of curvature than the second projected pump outer edge portion Ep2, which is the outer edge portion on the pump shell 30 side extending from the second curvature change point Cp2 to the third curvature change point Cp3 from the outer peripheral side in the projected image of the pump blade 31 (rt2<rp2). The curvature center Ot2 of the second projected turbine outer edge portion Et2 is located closer to the rotation center axis AC side than the curvature center Op2 of the second projected pump outer edge portion Ep2. Thus, a reduction in the cross-sectional area of the flow path defined between adjacent turbine blades 41 of the turbine runner 4 toward the turbine outlet can be suppressed (the amount of reduction can be decreased), whereby the occurrence of flow separation on the turbine outlet side of the flow path can be suppressed, and the torque transfer loss can be reduced.

Moreover, in the torque converter 1 of the embodiment, the radius of curvature rt0 of the zeroth projected turbine outer edge portion Et0, which is the outer edge portion on the shell side extending from the inlet outer peripheral end 41i to the curvature change point Ct1 on the outermost peripheral side in the projected image of the turbine blade 41, is the same as the radius of curvature rp0 of the zeroth projected pump outer edge portion Ep0, which is the outer edge portion on the pump shell 30 side extending from the outlet outer peripheral end 31o to the curvature change point Cp1 on the outermost peripheral side in the projected image of the pump blade 31. That is, the outer contour line 41co of the turbine blade 41 has a symmetrical region where the outer contour line 41co of the turbine blade 41 is symmetrical to the outer contour line 31co of the pump blade 31, and an asymmetrical region where the outer contour line 41co of the turbine blade 41 is not symmetrical to the outer contour line 31co of the pump blade 31. The inlet outer peripheral end 41i of the turbine blade 41 is included in the symmetrical region, and the outlet inner peripheral end 41o of the turbine blade 41 is included in the asymmetrical region. This enables the hydraulic oil to smoothly flow from the pump impeller 3 into the turbine runner 4, whereby the torque transfer loss can be reduced.

In the torque converter 1 of the embodiment, the dimensions of the pump impeller 3, the turbine runner 4, the stator 6, and the like are determined such that the difference (Rtp−Rso) between the rotation radius Rtp of the pump blades 31 and the turbine blades 41 and the rotation radius Rso of the outer peripheral ends of the stator blades 61 is less than half of the difference (Rtp−Rsi) between the rotation radius Rtp of the pump blades 31 and the turbine blades 41 and the rotation radius Rsi of the inner peripheral ends of the stator blades 61. Thus, the cross-sectional area on the turbine outlet side of the flow path defined between adjacent turbine blades 41 of the turbine runner 4 can be further increased, whereby the occurrence of flow separation on the turbine outlet side of the flow path can be suppressed, and the torque transfer loss can be reduced.

Note that in order to achieve both an improvement in torque capacity and device downsizing in the torque converter 1 of the embodiment, a ratio dt/dp of the length dt from the device centerline CC to the farthest point 41x located farthest from the device centerline CC in the extending direction of the rotation center axis AC of the turbine blade 41 to the length dp from the device centerline CC to the farthest point 31x located farthest from the device centerline CC in the extending direction of the rotation center axis AC of the pump blade 31 may be set in the range of 1.05≤dt/dp≤1.20, for example. If a flatness $\Lambda$ of the torque converter 1 is expressed as $\Lambda=(dt+dp)/(Rtp-Rsi)$, the torque converter 1 is preferably structured so as to satisfy 0.5≤$\Lambda$≤0.7, for example. Moreover, the projected image of the pump blade 31 of the embodiment described above includes the three curvature change points Cp1, Cp2, and Cp3 in the outer edge portion on the pump shell 30 side, and the projected image of the turbine blade 41 of the embodiment described above includes the two curvature change points Ct1 and Ct2 in the outer edge portion on the turbine shell 40 side. However, the number of curvature change points in the projected images of the pump blade 31 and the turbine blade 41 is not limited to these examples, and may be arbitrarily determined.

Although a mode for carrying out the present invention is described above based on an embodiment, it is to be understood that the present invention is not limited to the above embodiment and various modifications are conceivable without departing from the scope of the present invention.

INDUSTRIAL APPLICABILITY

The present invention can be used in the manufacturing field of fluidic torque transfer devices such as torque converters, and the like.

The invention claimed is:

1. A fluidic torque transfer device, comprising:
a pump impeller that includes a pump shell, a pump blade attached to the pump shell, and a pump core attached to the pump blade;
a turbine runner that includes a turbine shell, at least first and second turbine blades attached to the turbine shell along respective first and second outer contour lines, and a turbine core attached to the turbine blades and
a stator that includes a stator blade, and rectifies a flow of a hydraulic fluid from the turbine runner to the pump impeller, wherein
an attachment angle of the turbine blades at a fluid outlet of the turbine runner is smaller than the attachment angle of the turbine blades at a fluid inlet of the turbine runner the attachment angle being defined as an average of (a) an absolute value of an angle of an endpoint of the first turbine blade with respect to a perpendicular in a y-direction, and (b) an angle formed by a tangent to a point of contact between the adjacent second turbine blade and an inscribed circle with respect to the perpendicular in the y-direction when the inscribed circle contacting the first turbine blade outer contour line adjacent to the first turbine blade endpoint is drawn,
a radius of an inscribed circle that is inscribed at the fluid outlet of the turbine runner on an outer contour line of the turbine blade on the turbine shell side and an inner contour line of the turbine blade on the turbine core side is larger than a radius of an inscribed circle that is inscribed at the fluid inlet of the turbine runner on the outer contour line and the inner contour line, and
the outer contour line of the turbine blade extends outward in an extending direction of a rotation center axis of the pump impeller and the turbine runner on the fluid outlet side of the turbine runner more than an outer contour line of the pump blade on the pump shell side.

2. The fluidic torque transfer device according to claim 1, wherein
a length from a device centerline to a farthest portion located farthest from the device centerline in the extending direction of the rotation center axis of the turbine blade is longer than a length from the device centerline to a farthest portion located farthest from the device centerline in the extending direction of the rotation center axis of the pump blade, wherein the device centerline is a line that extends through a center between a fluid outlet outer peripheral end of the pump blade and a fluid inlet outer peripheral end of the turbine blade that face each other, extends through the rotation center axis of the pump impeller and the turbine runner, and extends perpendicular to the rotation center axis.

3. The fluidic torque transfer device according to claim 2, wherein
the outer contour line of the turbine blade is an outer edge on the turbine shell side in a projected image of the turbine blade formed when the turbine blade is projected onto a plane that includes the device centerline and the rotation center axis in a state where the fluid outlet outer peripheral end faces the fluid inlet outer peripheral end,
the inner contour line of the turbine blade is an inner edge on the turbine core side in the projected image formed when the turbine blade is projected onto the plane, and
the outer contour line of the pump blade is an outer edge on the pump shell side in a projected image of the pump blade formed when the pump blade is projected onto the plane.

4. The fluidic torque transfer device according to claim 3, wherein
a difference between an attachment angle of the pump blade at a fluid inlet of the pump impeller and the attachment angle of the pump blade at a fluid outlet of the pump impeller is smaller than a difference between the attachment angle of the turbine blade at the fluid inlet of the turbine runner and the attachment angle of the turbine blade at the fluid outlet of the turbine runner.

5. The fluidic torque transfer device according to claim 4, wherein
the outer contour line of the turbine blade has a symmetrical region where the outer contour line of the turbine blade is symmetrical to the outer contour line of the pump blade, and an asymmetrical region where the outer contour line of the turbine blade is not symmetrical to the outer contour line of the pump blade, wherein the symmetrical region includes the fluid inlet outer peripheral end of the turbine blade, and the asymmetrical region includes a fluid outlet inner peripheral end of the turbine blade.

6. The fluidic torque transfer device according to claim 5, wherein
when the pump blade and the turbine blade are projected onto the plane that includes the device centerline and the rotation center axis of the pump impeller and the turbine runner in the state where the outlet outer peripheral end faces the inlet outer peripheral end, each of the projected image of the pump blade and the projected image of the turbine blade includes at least one curvature change point in an outer edge portion on one of the pump shell side and the turbine shell side; a projected turbine outer edge portion, which is the outer edge portion on the turbine shell side extending with a constant curvature from the curvature change point on an outermost peripheral side in the projected image of the turbine blade, has a smaller radius of curvature than a projected pump outer edge portion, which is the outer edge portion on the pump shell side extending with a constant curvature from the curvature change point on an outermost peripheral side in the projected image of the pump blade; and a curvature center of the projected turbine outer edge portion is located closer to the rotation center axis side than a curvature center of the projected pump outer edge portion.

7. The fluidic torque transfer device according to claim 6, wherein an $n^{th}$ (where "n" is an integer of 2 or more) projected turbine outer edge portion, which is the outer edge portion on the turbine shell side extending from an $n^{th}$ curvature change point from an outer peripheral side in the projected image of the turbine blade to one of an $(n+1)^{th}$ curvature change point and the fluid outlet inner peripheral end in the projected image of the turbine blade, has a smaller radius of curvature than an $n^{th}$ projected pump outer edge portion, which is the outer edge portion on the pump shell side extending from an $n^{th}$ curvature change point from an outer peripheral side in the projected image of the pump blade to one of an $(n+1)^{th}$ curvature change point and an inlet inner peripheral end in the projected image of the pump blade; and a curvature center of the $n^{th}$ projected turbine outer edge portion is located closer to the rotation center axis side than a curvature center of the $n^{th}$ projected pump outer edge portion.

8. The fluidic torque transfer device according to claim 7, wherein a difference between a rotation radius of the pump blade and the turbine blade and a rotation radius of an outer peripheral end of the stator blade is less than half of a difference between the rotation radius of the pump blade and the turbine blade and a rotation radius of an inner peripheral end of the stator blade.

9. The fluidic torque transfer device according to claim 1, wherein a difference between an attachment angle of the pump blade at a fluid inlet of the pump impeller and the attachment angle of the pump blade at a fluid outlet of the pump impeller is smaller than a difference between the attachment angle of the turbine blade at the fluid inlet of the turbine runner and the attachment angle of the turbine blade at the fluid outlet of the turbine runner.

10. The fluidic torque transfer device according to claim 1, wherein the outer contour line of the turbine blade has a symmetrical region where the outer contour line of the turbine blade is symmetrical to the outer contour line of the pump blade, and an asymmetrical region where the outer contour line of the turbine blade is not symmetrical to the outer contour line of the pump blade, wherein the symmetrical region includes the fluid inlet outer peripheral end of the turbine blade, and the asymmetrical region includes a fluid outlet inner peripheral end of the turbine blade.

11. The fluidic torque transfer device according to claim 10, wherein when the pump blade and the turbine blade are projected onto the plane that includes the device centerline and the rotation center axis of the pump impeller and the turbine runner in the state where the outlet outer peripheral end faces the inlet outer peripheral end, each of the projected image of the pump blade and the projected image of the turbine blade includes at least one curvature change point in an outer edge portion on one of the pump shell side and the turbine shell side; a projected turbine outer edge portion, which is the outer edge portion on the turbine shell side extending with a constant curvature from the curvature change point on an outermost peripheral side in the projected image of the turbine blade, has a smaller radius of curvature than a projected pump outer edge portion, which is the outer edge portion on the pump shell side extending with a constant curvature from the curvature change point on an outermost peripheral side in the projected image of the pump blade; and a curvature center of the projected turbine outer edge portion is located closer to the rotation center axis side than a curvature center of the projected pump outer edge portion.

12. The fluidic torque transfer device according to claim 10, wherein an $n^{th}$ (where "n" is an integer of 2 or more) projected turbine outer edge portion, which is the outer edge portion on the turbine shell side extending from an $n^{th}$ curvature change point from an outer peripheral side in the projected image of the turbine blade to one of an $(n+1)^{th}$ curvature change point and the fluid outlet inner peripheral end in the projected image of the turbine blade, has a smaller radius of curvature than an $n^{th}$ projected pump outer edge portion, which is the outer edge portion on the pump shell side extending from an $n^{th}$ curvature change point from an outer peripheral side in the projected image of the pump blade to one of an $(n+1)^{th}$ curvature change point and an inlet inner peripheral end in the projected image of the pump blade; and a curvature center of the $n^{th}$ projected turbine outer edge portion is located closer to the rotation center axis side than a curvature center of the $n^{th}$ projected pump outer edge portion.

13. The fluidic torque transfer device according to claim 1, wherein a difference between a rotation radius of the pump blade and the turbine blade and a rotation radius of an outer peripheral end of the stator blade is less than half of a difference between the rotation radius of the pump blade and the turbine blade and a rotation radius of an inner peripheral end of the stator blade.

14. The fluidic torque transfer device according to claim 1, wherein the y-direction is a radial direction in which the turbine blades extend.

* * * * *